May 9, 1967     A. FISCHER     3,318,183
EXPANSION ANCHOR
Filed Dec. 4, 1964
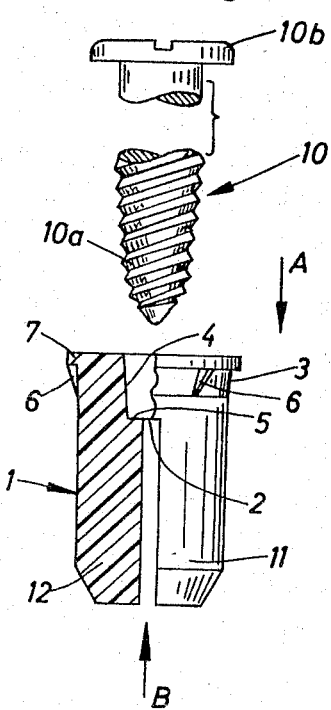
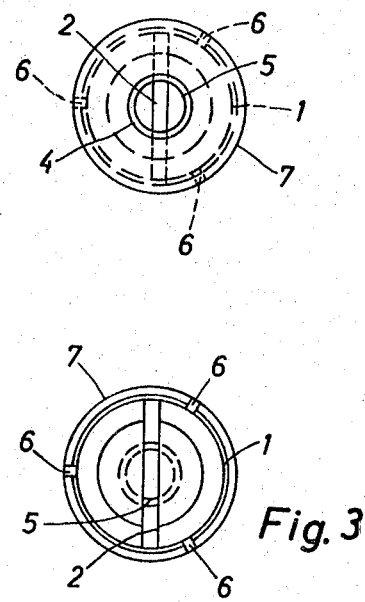
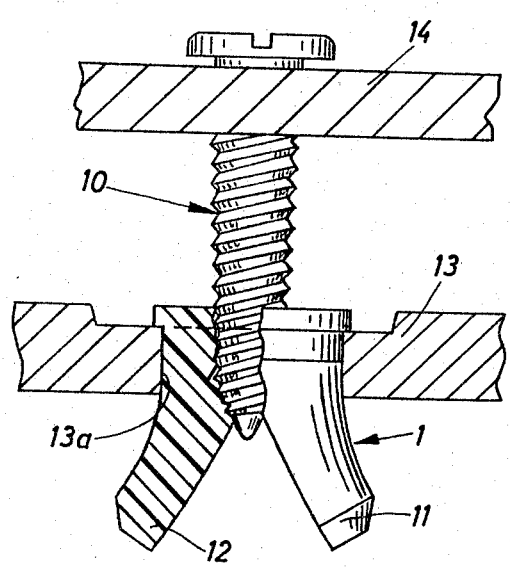
INVENTOR.
ARTUR FISCHER
BY
Michael J. Striker

United States Patent Office 3,318,183
Patented May 9, 1967

3,318,183
EXPANSION ANCHOR
Artur Fischer, Tumlingen, Kreis Freudenstadt, Germany
Filed Dec. 4, 1964, Ser. No. 415,874
Claims priority, application Germany, Dec. 7, 1963,
F 41,500
1 Claim. (Cl. 85—84)

The present invention relates to expansion anchors in general, and more particularly to expansion anchors for fastening of objects to relatively thin plates or the like. The anchoring member of such an expansion anchor extends, for example, through an opening in a thin plate or the like and may be expanded by a threaded fastener which extends through the object to be fastened and into engagement with the anchoring member.

In practice it has been found that a particular difficulty encountered with such expansion anchors resides in the very slight retention capability of the anchoring member with respect to the threaded fastener. Frequently, it has been found in practice that the engagement provided by the anchoring member for the fastener is so slight as to provide inadequate support. Many of the expansion anchors presently in use have anchoring members with guide bores for the fastener which bores are longer than the thickness of the support plate so that very little, if any, support is provided for the fastener in this region.

One object of the present invention is to provide a relatively short anchoring member which is capable of expanding to a degree which permits dependable anchoring thereof in a relatively thin plate.

Another object of the present invention is to provide an expansion anchor of the above type in which the fastener is reliably supported in and is prevented from moving out of engagement with the anchoring member.

A further object of the present invention is to provide a relatively short anchoring member capable on the one hand, to be securely anchored in a relatively thin plate or the like, and on the other hand, to provide a reliable and strong support for a threaded fastener engaging therewith.

A concomitant object of the present invention is to provide an expansion anchor which is capable of providing a secure support despite the relative weakness of the wall of the thin support element such as, for example, a sheet metal plate.

An additional object of the present invention is to provide an expansion anchor of the above type which is capable of expanding into engagement with the relatively thin support element along the entire axial length of the expansion anchor hole in which such anchor is inserted.

Still another object of the present invention is to provide an expansion anchor of the above type which, on the one hand, is capable of providing a strong grip on a threaded fastener engaging therewith, and on the other hand, prevents stripping of threads and resulting reduction in support of such a threaded fastener.

With the above objects in view, the present invention provides an anchoring member adapted to be received in the expansion anchor hole of a support member. The anchoring member consists of elastically deformable material and has an elongated body having a bore extending inwardly from one toward, but short of the other end thereof, and at least one transverse slot extending inwardly from the other end toward, but short of the first mentioned end and communicating with the bore. The slot forms in the corresponding portion of the anchoring member a plurality of tongues which are movable away from each other in response to insertion of a fastener through the bore and into the slot to increase the width of the slot.

The novel features which are considered as characteristic of the invention are set forth in particular in the appended claim. The invention itself, however, both as to its construction and its method of operation, together with additional objects and advantages thereof, will be best understood from the following detailed description of a specific embodiment with reference to the accompanying drawings, in which:

FIG. 1 is a partly sectional elevation of an expansion anchor showing both the fastener and the anchoring member constructed in accordance with the present invention;

FIG. 2 is a top plan view of the anchoring member of FIG. 1 as seen in the direction of arrow A in FIG. 1;

FIG. 3 is a bottom plan view of the anchoring member as seen in the direction of arrow B in FIG. 1; and FIG. 4 is a partly sectional illustration of an assembled expansion anchor.

Referring to FIGS. 1, 2 and 3, the expansion anchor is shown to comprise an anchoring member or sleeve, shown here in unexpanded condition, and an elongated fastener 10 shown in FIG. 1, in a position it assumes prior to insertion into member 1. Fastener 10 preferably has a threaded stem 10a which may, but need not be, tapered, and a head 10b suitable for driving the fastener.

Anchoring member 1 is preferably relatively short in length and is preferably made of synthetic plastic material which is elastic and resistant to aging and corrosion. The elongated body which forms the anchoring member of the present invention, as the same is illustrated in FIG. 1, is cylindrical in shape and is provided with a preferably axial frustoconical bore 4 extending inwardly from one end of the body toward but terminating short of the other end thereof, and at least one transverse, preferably axial, slot 2, extending inwardly from the other end toward but terminating short of, the first end thereof, and dividing the corresponding portion of the body into a pair of tongues 12 which, because of the elastic nature of the material of the body are movable outwardly away from each other. The bore 4 and the slot 2, however, extend inwardly from opposite ends of the member 1, a sufficient distance so as to directly communicate with one another. Thus, while the slot 2 may extend partially into the bore 4 it extends at least to the smaller diameter end 5 thereof. The axial length of bore 4 is substantially less than the axial length of the slot 2. These lengths having preferably a range in the order of magnitude of 1:3. The member 1 is preferably provided with an annular shoulder 7 which surrounds the larger diameter end of the bore 4 and with a frustoconical neck portion 3 also surrounding the bore 4 and adjacent to the shoulder 7. The neck portion 3 may be provided at its outer periphery with rotation preventing fins 6 which may, as illustrated in FIGS. 1, 2 and 3, extend radially outwardly from the surface of the shoulder 3 and taper toward the slotted end of the member 1. The slotted end of the member 1 may further be provided with a chamber to facilitate insertion of the member into an expansion anchor hole 13a in a support plate 13 or the like.

The elongated stem 10a of the fastener 10 is, as illustrated in FIG. 1, preferably provided with a threaded portion having a diameter greater than the smaller diameter of the bore 4. As seen in FIG. 4, in operation the anchoring member 1 is inserted into an expansion anchor hole 13a, in a supporting plate, for example, a thin plate such as a sheet metal plate 13. The fastener 10 engages a plate 14 which may be desired to support on plate 13. The stem 10a of the fastener 10 is driven into the bore 4 and, being of larger diameter, engages the material surrounding the bore 4 so as to deform the same and to force it simultaneously into meshing engagement with the fastener. The corresponding portion of the member 1 expands outwardly into firm engagement with the wall of the hole 13a. The bore 4 acts to guide the fastener 10 into the slot 2. Slot 2 is at least as narrow as the shorter diameter end of bore 4 so that, when the fastener is driven further into the member 1 its leading end enters the slot 2 and forces the walls of the slot apart to widen the slot, thus forcing the tongues 11, 12 to move away from each other and outwardly beyond the hole 13a. Thus, the anchoring member 1 in deformed condition is securely anchored to the plate 13 and securely grips the fastener 10.

The materials of the fastener 10 and member 1 as well as the diameter relationship between the bore 4 and stem 10a are preferably such that the fastener 10 will actually cut its own threads in the member 1 while being screwed into the same. The bore 4, therefore, while guiding the fastener 10 into directly communicating slot 2, threadedly engages the fastener, the material surrounding the bore being deformed outwardly into firm engagement with the wall 13a so as to provide a strong and reliable support for the fastener 10 and the object 14 to be supported thereby. It will be understood that it is equally feasible to provide additional slots (not shown) whereby the corresponding portion of the member 1 would be divided into four or more tongues all of which would be movable away from each other to increase the effectiveness and the diameter of the slotted portion of the anchoring member in response to insertion of a fastener therebetween.

The diameter of the shoulder 7 exceeds, in unexpanded condition of the member 1, the diameter of the hole 13a into which the member 1 is inserted. Thus, the shoulder 7 prevents the anchoring member from being pushed through the hole in which it is inserted, when the fastener is being driven in. The neck portion 3 is frustoconical in shape and thus provides a good seat for member 1 in the hole 13a, regardless of any tolerance variations, while the fastener is being driven in. Fins 6 may be deformed by the pressure of driving the fastener 10 so as to provide between engagement with the wall of hole 13a and to provide edges which, at least frictionally, act to prevent rotation of the member 1 while the fastener is being driven therein.

The member 1 is preferably relatively short so as to be particularly suitable for use with thin plate supports.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

An expansion anchor, comprising an anchoring member adapted to be received in an expansion anchoring hole, said anchoring member comprising an elongated elastic body having a frusto-conical bore extending inwardly from one end toward but short of the other end of said member and increasing in cross-sectional area in direction toward said one end, a substantially radially extending internal face located at the inner end of said bore, and transverse slot means extending diametrically inwardly from said other end toward but short of said one end, said slot means dividing the corresponding portion of said anchoring member into a plurality of tongues movable away from each other and said slot means dividing said internal face and communicating with said bore; and fastener means including an elongated screw having a head and a leading end and conically tapering from said head to said leading end, said elongated screw having a length greater than the depth of said frusto-conical bore, and adjacent said head thereof a diameter greater than the diameter of said frusto-conical bore and in the region of its leading end a diameter greater than the diameter of said transverse slot means so that upon insertion of said elongated screw into said bore said leading end bears against said internal face and moves said tongues apart while penetrating into said slot means.

References Cited by the Examiner

UNITED STATES PATENTS

| 2,302,590 | 11/1942 | Waite | 85—84 |
| 2,366,965 | 1/1945 | Johnson | 85—82 |
| 2,641,379 | 6/1953 | Barbaro | 85—84 |
| 3,178,991 | 4/1965 | Bisbing | 85—84 |
| 3,188,905 | 6/1965 | Millet | 85—84 |
| 3,198,058 | 8/1965 | Barry | 85—84 |

FOREIGN PATENTS

| 455,280 | 10/1936 | Great Britain. |
| 589,648 | 6/1947 | Great Britain. |

CARL W. TOMLIN, *Primary Examiner.*

R. S. BRITTS, *Assistant Examiner.*